J. J. WOHLGEMUTH AND F. LILLY.
RESILIENT TIRE CORE.
APPLICATION FILED SEPT. 28, 1918.
1,307,800.
Patented June 24, 1919.
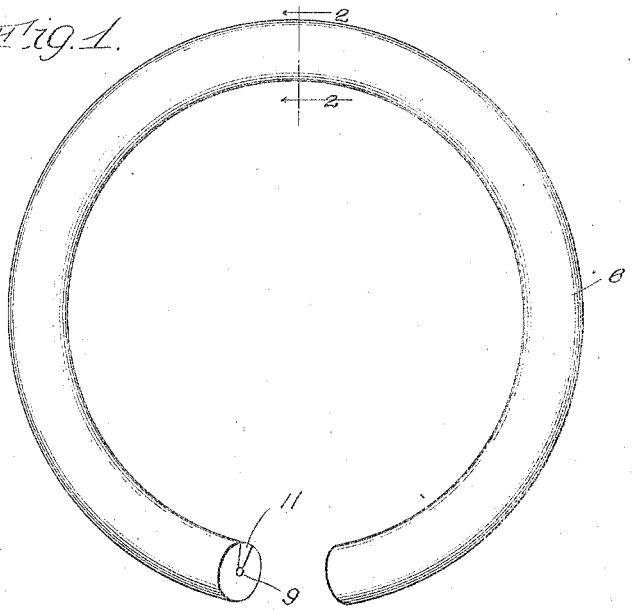
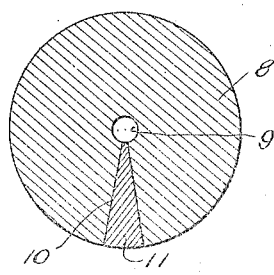
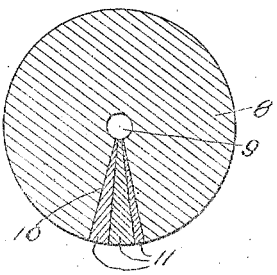
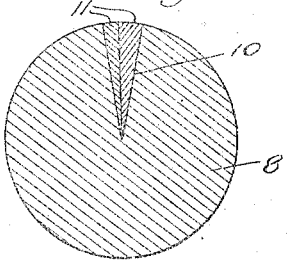
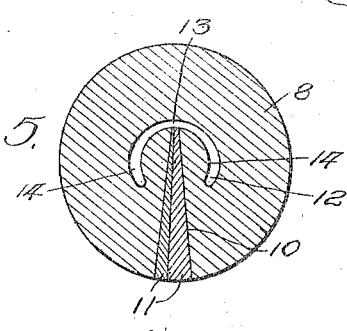
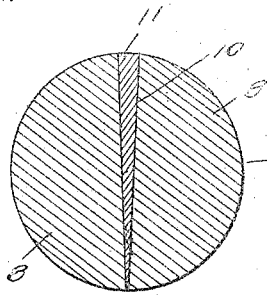
Witness:
Inventors,
Jacob J. Wohlgemuth
and Ford Lilly
By Brown & Nissen
Attys.

UNITED STATES PATENT OFFICE.

JACOB J. WOHLGEMUTH AND FORD LILLY, OF CHICAGO, ILLINOIS, ASSIGNORS TO LAFAYETTE RUBBER COMPANY, OF CHICAGO, ILLINOIS, A CORPORATION OF SOUTH DAKOTA.

RESILIENT TIRE-CORE.

1,307,800.     Specification of Letters Patent.     Patented June 24, 1919.

Application filed September 28, 1918. Serial No. 256,015.

*To all whom it may concern:*

Be it known that we, JACOB J. WOHLGE-MUTH and FORD LILLY, citizens of the United States, residing at Chicago, in the county of Cook and State of Illinois, have invented certain new and useful Improvements in Resilient Tire-Cores, of which the following is a specification.

Our invention relates to tire fillers or tire cores for vehicles, and has for its object the provision of simple and efficient means for varying the cross-section of a tire core so as to make the latter fit a plurality of sizes of outer tires or casings.

Other objects will appear hereinafter.

An embodiment of our invention is shown in the accompanying drawing forming a part of this specification and in which—

Figure 1 is a side view of a tire core embodying our invention and ready to be inserted in an outer casing.

Fig. 2 is a cross-section of a tire core provided with one wedge member in accordance with our invention.

Fig. 3 is a similar view showing three wedge members fitted in the tire core.

Fig. 4 is a similar view showing a tire core with two wedge members fitted therein.

Fig. 5 is a similar view showing a tire core having an opening in its central portion with two wedges fitted therein.

Fig. 6 is a similar view showing a wedge reaching across the tire core; and

Fig. 7 is a view of a cylindrical piece of tire core embodying our invention.

Referring more particularly to the drawing, in Fig. 1 we have shown a tire core 8 which may be of any desired substance, such as rubber substitute, sponge rubber, or any other material which will answer the purpose of a tire core. In use we prefer to use a sponge rubber or rubber with inclosed gas cells, but do not wish to confine this invention to such material alone.

In Fig. 2 we have shown the tire core 8 as being provided with an opening 9 at its center. The opening 9 is shown as being cylindrical, but any other cross-section of this opening may be provided. In Fig. 2 we have shown a groove 10 formed in the tire core 8 as extending from the opening 9 to the periphery of the tire core 8. In the groove 10 is fitted a wedge member 11 which is preferably of the same material as the tire core 8, but may be of any desirable substance.

In Fig. 3 we have shown a tire core similar to that indicated in Fig. 2, but in the groove 10 is shown a plurality of wedges 11, each being of a different thickness from the others. This is intended to show that one or more wedges 11 may be used, and by providing these wedges in different thicknesses the size of the tire core 8 may be varied anywhere between the cross-section of such tire core 8 without a wedge member in groove 10 to a cross-section where as many wedges 11 as may be desired are fitted in the groove 10.

In Figs. 2 and 3 it is intended to show that the wedge or wedges 11 are fitted in from the inner circumference of the tire core 8, such as indicated in Fig. 1.

In Fig. 4 the wedges 11 are fitted in the outer or tread surface of the core 8. From this it will be apparent that the grooves 10 and wedge members 11 may extend into the tire core from any part of the periphery of the latter, the important thing being to increase the cross-section of the tire core to make the latter fit outer casings of different sizes.

In Fig. 5 we have shown the tire core 8 as having an opening 12 which in cross-section resembles a horseshoe, except that the central portion 13 thereof is considerably narrower than the end portions 14. By thus providing the opening 12 with its end portions wider than the central portion, the internal strains on the tire core 8 caused by the wedges 11 are more even than in a construction, such as shown in Figs. 2 to 4, inclusive.

In Fig. 6 we have indicated the groove 10 and wedge 11 as reaching across the tire core 8. This is desired to indicate that the groove 10 and wedge or wedges 11 may extend into the tire core 8 as far as desired, or entirely through it if desired.

In making up the material of the tire core 8, it may be formed in cylindrical portions as indicated in Fig. 7 in molds or otherwise, or in suitable molds giving it the general form indicated in Fig. 1. Also, the molds or forms may be shaped to mold the groove 10 in the tire core 8 when the latter is formed, or the tire core 8 may be molded or formed without the groove 10 in it and such groove cut afterward in any desirable manner.

We claim:—

1. A vehicle tire core comprising an elongated resilient member having a groove extending throughout its length, and a plurality of resilient members disposed side by side in and filling said groove.

2. A vehicle tire core comprising an elongated resilient member having a groove extending throughout its length, and a plurality of resilient wedges disposed in and filling said groove, each wedge being of a different thickness than each of the other wedges.

3. A tire core comprising an elongated resilient member having a groove sector-shaped in cross-section of such member and an opening, said groove and opening extending the full length of said member, and a plurality of wedges of different thicknesses disposed in and filling said groove.

4. A vehicle tire core comprising an elongated resilient member having an opening extending throughout its length and a groove extending from said opening to the periphery of said member, and a wedge member in and filling said groove.

5. A tire core comprising an elongated resilient member having an opening horseshoe shaped in cross-section of such member extending throughout the length of the latter and a groove extending from the central portion of said opening to the periphery of said member, and a wedge member in and filling said groove.

6. A tire core comprising an elongated resilient member having an opening horseshoe shaped in cross-section of such member extending throughout the length of the latter and a groove extending from the central portion of said opening to the periphery of said member, and a wedge member in and filling said groove, said horseshoe-shaped opening being considerably wider at its edge portions than at its central portion.

In testimony whereof we have signed our names to this specification on this 24th day of September A. D. 1918.

JACOB J. WOHLGEMUTH.
FORD LILLY.